F. B. WILDMAN.
CIRCULAR KNITTING MACHINE.
APPLICATION FILED JUNE 18, 1912.
1,167,866.
Patented Jan. 11, 1916.
4 SHEETS—SHEET 1.
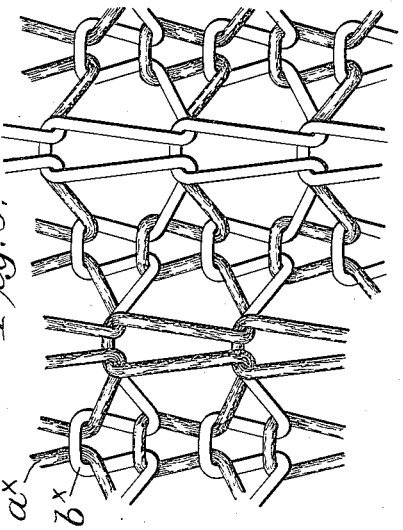
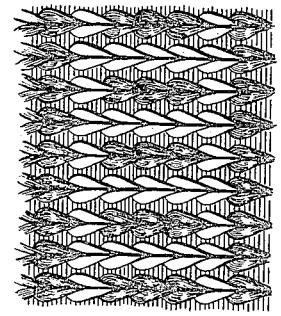
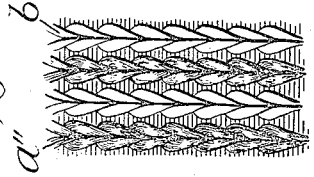
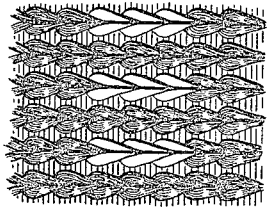
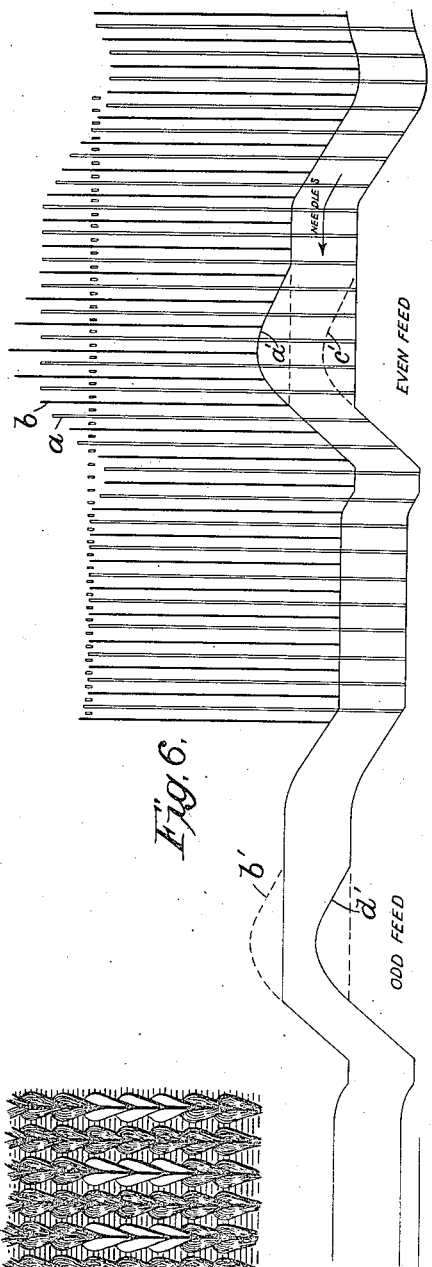
Attest:
Ewd L. Tolson
H. L. Alden
Inventor:
Frank B. Wildman,
by Spear, Middleton, Donaldson & Spear Attys.

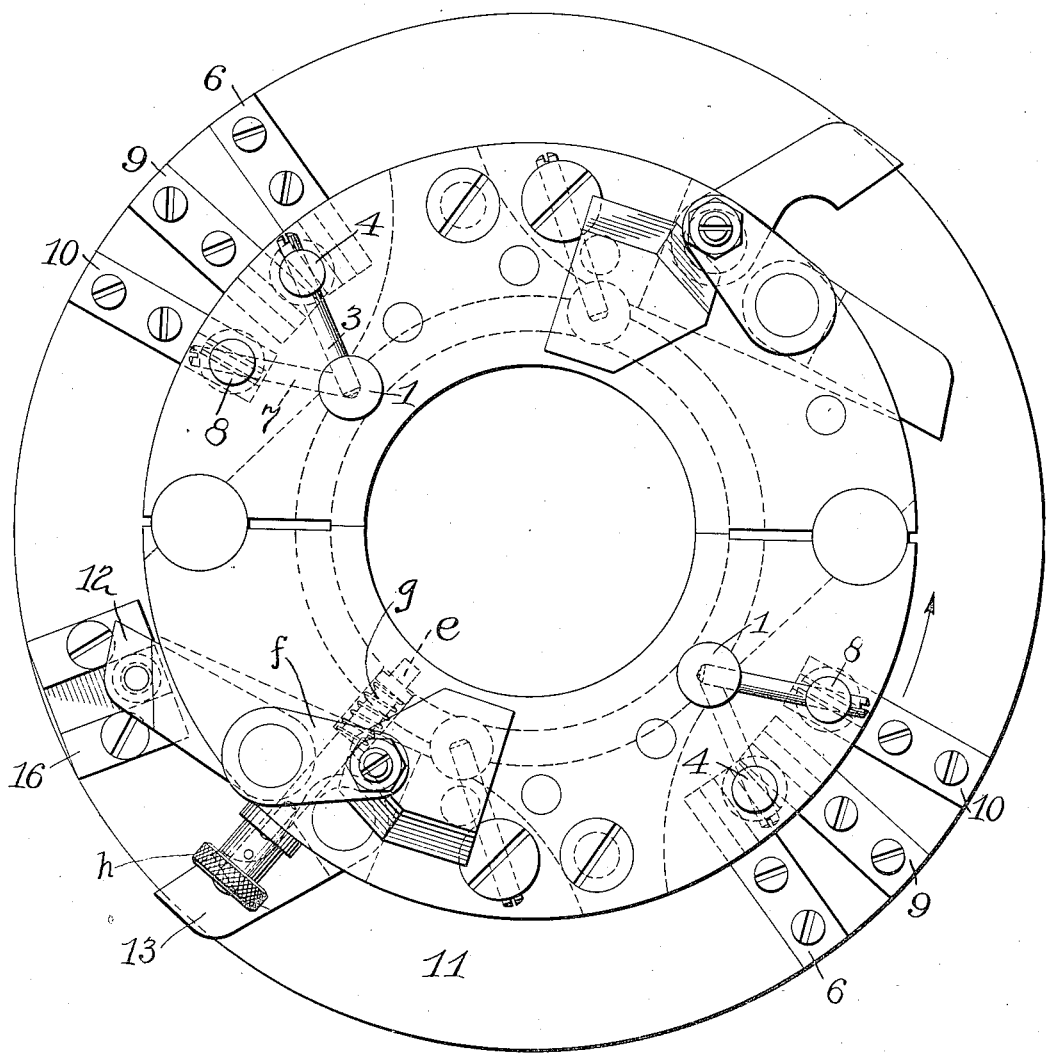

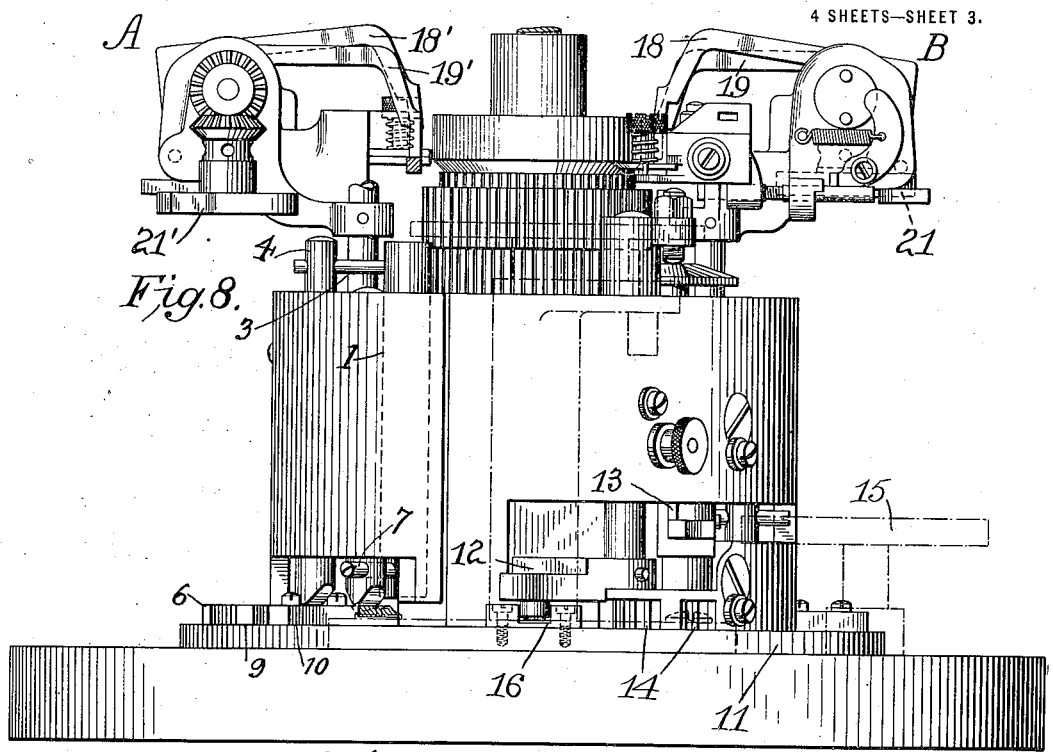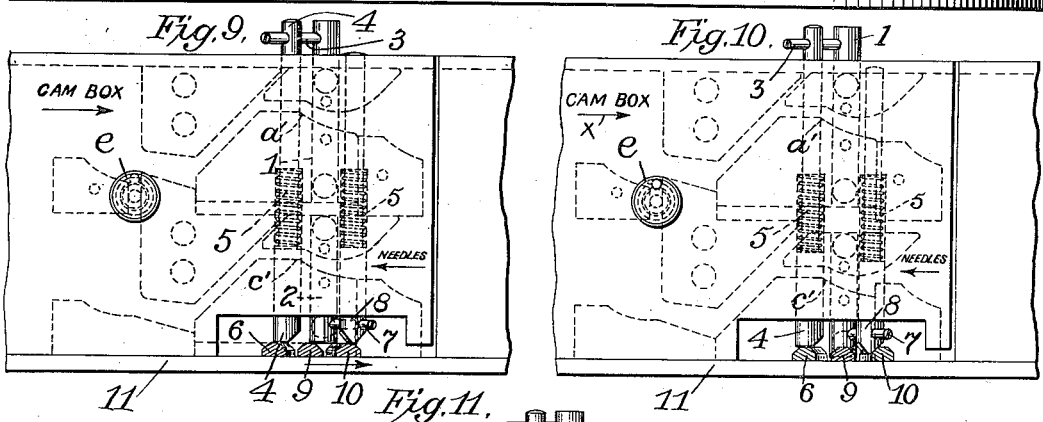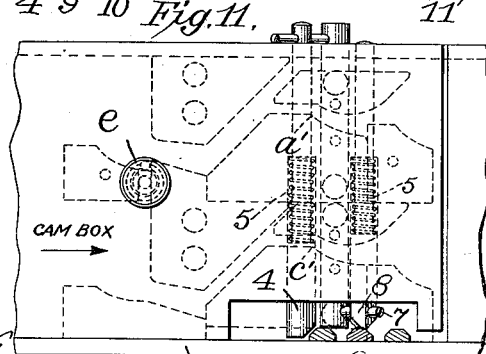

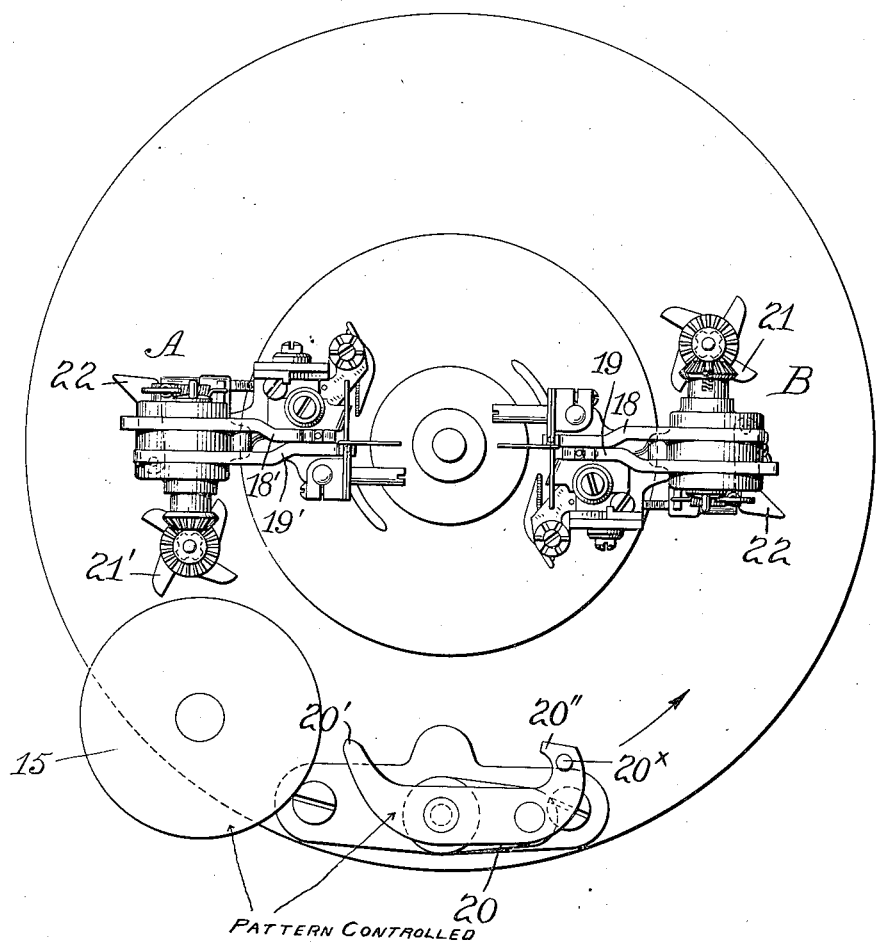

UNITED STATES PATENT OFFICE.

FRANK B. WILDMAN, OF NORRISTOWN, PENNSYLVANIA, ASSIGNOR TO WILDMAN MFG. CO., OF NORRISTOWN, PENNSYLVANIA, A CORPORATION OF PENNSYLVANIA.

CIRCULAR-KNITTING MACHINE.

1,167,866.  Specification of Letters Patent.  Patented Jan. 11, 1916.

Application filed June 18, 1912. Serial No. 704,440.

*To all whom it may concern:*

Be it known that I, FRANK B. WILDMAN, citizen of the United States, residing at Norristown, Pennsylvania, have invented certain new and useful Improvements in Circular-Knitting Machines, of which the following is a specification.

The invention relates to tubular fabrics adapted for neckties and the like, and to the method of and machine for forming said fabric.

In the drawings Figure 1 is a view of a complete tie; Figs. 2, 3 and 4 are enlarged views of portions of the fabric; Fig. 5 is a diagram of the fabric; and Fig. 6 is a diagram relating to the needles and cams of the machine; Fig. 7 is a plan view of a knitting head embodying my invention; Fig. 8 is a side view of the knitting head; Fig. 9 is a diagram in the nature of a side elevation of the machine showing the cams in position for knitting plain rib fabric; Fig. 10 is a view similar to Fig. 9 of the cams at one feed in a different position from that shown in Fig. 9; Fig. 11 is a view similar to Fig. 9 with the cams in another position; Fig. 12 is a detail view of a grooved cam which might be used. Fig. 13 is a plan view of the machine with stripers in position.

The fabric is produced on and the method involved is carried out by a circular machine. This machine includes an automatic striper or a plurality of stripers, the number not being limited, and rib knitting mechanism in which the needles of either set are divided into two groups, as shown in Fig. 6, this being representative of any desired grouping. This figure, by way of example, shows the needles of the two groups as alternating with each other, though other groupings may be employed, as groups of needles may alternate with other groups or with single needles, and this grouping may be made in respect to either the cylinder or the dial needles. In the form selected for illustrating my invention, the grouping of the needles is carried out in connection with the cylinder needles. Each group of needles is controllable independently of the other group by its own set of cams. I designate one group of needles $a$ shown in double lines, these being referred to hereinafter as the white needles, and the other group $b$ shown in single black lines, and referred to hereinafter as the black needles. The respective advancing cams of these needles are shown in the diagram, Fig. 6, at $a'$, $b'$, $c'$, and $d'$. With these two groups of needles those of one group may be knitting while those of the other group may be tucking, these actions taking place at the same feed. The machine also includes automatically operating means for controlling the elements above mentioned, i. e., the striper or stripers, and the rib knitting mechanism, so that a portion of the fabric may be knit in solid color suitable, for instance, for the neckband of a tie in the plain rib stitch, and the other portion of the fabric may be knit in differently colored vertical stripes or checks in tuck stitch. The combination of these elements makes it possible to produce a wide range of pleasing patterns.

With the arrangement of needles in two groups and with their cams adjusted as shown in full lines, the introduction of black yarn at the even feed and of white yarn at the odd feed will produce on the face of the tie alternate black and white vertical single tuck stripes one wale in width, the black needles $b$ knitting black at this feed, while the white needles tuck, and thus hide the black thread at this even feed, while at the odd feed the black needles tuck and thus hide the white thread, and the white needles knit white at this feed, thus producing, as just stated, alternate black and white vertical single tuck stripes one wale in width. The fabric produced as a result of this is illustrated in Fig. 2, wherein $a''$ represents the stitches of the black striper, while $b''$ represents the stitches of the white striper. Now, supposing the striper at the odd feed changes to black so that black thread is introduced at both feeds, the face of the tie becomes solid black in the single tuck stitch, and thereafter if the striper at the odd feed again feeds white yarn, the face of the tie will be a series of white vertical checks in a black field, as shown in Fig. 3.

Fig. 4 represents a fabric the design of which is a combination of check and stripe. It will thus be seen that by manipulating the cams and changing the yarn a wide range of patterns may be obtained. This adjustment of the cams and the changing of the yarn are effected respectively through a controlling disk 15 and a controlling claw 20, as will be described hereinafter.

Supposing the needles in both groups knit at both feeds, in contradistinction from tucking, and the same color of yarn is fed at both feeds, solid color plain rib fabric will be produced which, being narrower owing to the difference in character and length of the stitch, is suitable for the neckband of the tie.

The structure of the wide or tab ends of the tie where the tucking is done is shown in Fig. 5, where one thread hides the other, the black and white threads being indicated at $a^x$, $b^x$.

In addition to the elements above described, I employ means for producing a tuck stitch on the undivided set of needles, i. e., the set the needles of which are not grouped as above described. This tucking attachment does not necessarily coöperate with the divided set of needles to produce a new kind of stitch, but is used for tucking in the otherwise plain rib fabric to produce an additional variety to the pattern, just as the color of the plain rib might be changed by the striper without change in the action of the divided set of needles.

It will be seen that one group of needles of the divided set is long, while the other group is short, the tucking, as in ordinary practice, depending upon whether the needle is moved out all the way or only part way to receive the thread. The drawings represent the fabrics facing out.

The machine for carrying out my invention I have shown as of the rotary cam type, though I do not limit myself to any particular type of machine. The advancing cams for the two groups of needles, long and short, for one side of the machine, or rather for one feed, are indicated in Fig. 9 at $a'$, $c'$. There is a set of these cams for each feed, and the present machine used as an illustration of my invention being a two-feed machine, the two sets of cams are arranged on opposite sides of the machine. The upper cams for short needles are attached to posts 1, Fig. 9, and the lower cams for the long needles are attached to posts 2, these posts being slidable vertically of the cam cylinder or box. The posts 1 of the upper cams are attached by pins 3 to rods 4 slidable vertically in the cam box, said rods being pressed downwardly by springs 5. The lower ends of these rods are beveled off to be operated by cams 6. These cams are in the form of blocks having inclines thereon. The posts of the lower advancing cams are connected at their lower ends by pins 7 with rods 8 guided in the cam box and also pressed downwardly by springs, the lower ends of these rods being beveled on both sides to be engaged and operated by inclines on blocks 9 and 10. These cam blocks 6, 9 and 10 are fixed to a ring 11 surrounding the cylinder cam box and for operating the ring to make the cam bars act on the rods 4 and 8 or to withdraw them therefrom I employ arms 12, 13 on shafts journaled in the cam box, said shafts being geared together, as at 14, so that as one arm is swung inwardly in relation to the cam cylinder the other arm will be moved outwardly, the said arms being operated by contact with a roller 15 which is raised and lowered to lie in the plane of movement of first one arm and then the other by pattern mechanism, as is customary in machines of the Wildman type. One of the arms 12 has a stud entering a groove of a block 16 fixed on the ring 11 so that as the arm swings it moves the ring and thus adjusts the cam blocks.

Referring to Fig. 9, it will be seen that the ring 11 is in such position that the cam blocks 6, 9 and 10 are holding both advancing cams $a'$, $c'$ up. This is true also of all the feeds, that is to say where two feeds are used as in the present example, the advancing cams at both feeds and for both the long and short needles are up so that plain rib knitting will be done.

Referring now to Fig. 10, ring 11 has been adjusted circumferentially, in respect to the cam cylinder, from the position shown in Fig. 9, so that the post 8 at this feed or this side of the machine will have moved down the incline of cam bar 10 under pressure of its spring, and the lower advancing cam will have lowered. The upper advancing cam will still be up at this feed so that here the upper cam or short needles will be knitting while the long needles will be tucking. On the other side of the machine or at the other feed the upper cam will be lowered and the lower cam will be raised so that at this other feed the short needles will be tucking while the long needles are knitting. This result is due to the manner of connecting up the sliding bars with the cam posts, for instance, at the feed shown in Fig. 10 the first sliding rod 8 in the direction of rotation (arrow $x$) of the cam cylinder is down and being connected with the lower cam $c'$ by the pin 7 and cam post 2 this cam $c'$ is also down, but at the other feed the first rod of the pair is connected with the upper cam post 1 (see at right of Fig. 7) so that this rod being down, the upper cam will be down also. The same relation exists between the rods 4 on opposite sides of the machine, that on the side illustrated in Fig. 10 and at the left of Fig. 7 being connected to the upper cam through the pin 3 and post 1 and consequently this cam being up, while that on the opposite side (at the right of Fig. 7) is connected to the lower cam which is therefore up. As a result, the long needles will be tucking in Fig. 10 and alternate, or other groupings of short needles will be knitting, while on the other side of the machine the long needles will be tucking while the short needles will be knitting.

Referring to Fig. 11, which represents the same feed as in Figs. 9 and 10, the ring 11 has been further shifted circumferentially so that the cam bars coöperating with the springs will make the upper and lower cams assume the respective positions shown in dotted lines. The long needles will be knitting here, their cam being raised, while the short needles will be tucking, their cam being lowered. At the other feed on the other side of the machine the relative position of the cam bars and vertically sliding rods 4 and 8 will be the same as in this view, but the first slide rod (8) is connected with the upper cam, which consequently makes the short needles knit, while the trailing or second slide rod 4 being connected with the lower cam $c'$, causes the lowering of this cam and tucking here takes place on the long needles.

Instead of using bars 6, 9 and 10 as cams, I may employ cam pieces such as illustrated in Fig. 12, these pieces being grooved so that the needle cams will be operated positively in both directions instead of by the springs. The groove of these cams would receive pins projecting from the rods 4 and 8 to operate them in an obvious manner. At $e$ is shown a gate piece carried by a stem $f$ pressed by a spring $g$ and having a finger piece $h$ at its outer end. By drawing upon this the gate piece is moved to leave an opening in the cam wall through which the long needles may be inserted into the lower cam groove.

I show two stripers A and B. These are substantially of the same form as those disclosed in Letters Patent of Hipwell, 815,167, March 13, 1906, and more particularly like those disclosed in Letters Patent of the United States 1,106,763 patented to myself and George L. Ballard, Aug. 11, 1914. Each of these stripers has two pairs of guide arms 18, 19, 18', 19', for the yarns, one arm of each being down to feed its yarn and the other arm of each being up to hold its yarn from being fed. These stripers are operated from a claw 20 having projections 20', 20", and a pin 20×, the projections acting upon star wheels 21, 21', one for each striper attachment. These star wheels are in different horizontal planes, and the claw is raised and lowered to these planes to operate either star wheel as required, the upward and downward movement of the claw being controlled by pattern mechanism similar to that disclosed in the application above referred to.

The claw 20 is constructed to operate either star wheel twice in its passage, when raised into the plane thereof, for introducing one thread by depressing its guide arm by one movement of the star wheel derived from striking the front point 20' of the claw and then to withdraw the other thread by raising its lever when the star wheel strikes the other projection 20" of the claw, the pin 20× being provided to operate the shear and clamp for the cut thread by striking a lever 22 on the striper in a manner substantially similar to the operation of shear and clamp described in the application above referred to, for first shearing the thread, and then clamping it until it is to be again introduced into the fabric. The operating connection between the star wheel and thread guide arms consists of gearing and a cam shaft as disclosed in the application above noted. The tuck on the dial needles may be obtained by adjusting the wing or advancing cam of the dial as is well known in machines of the Wildman type, such for instance as in Letters Patent No. 790,772, May 25, 1905.

The claw 20 and pattern disk 15 may be operated by any suitable form of pattern mechanism, but as an instance of such mechanism which may be used I would refer to that referred to in the application 659,262, above mentioned.

Pattern mechanism for lifting a controlling roller or disk, such as 15, is well known in the art, for instance as shown in Patent #794,474, and a similar pattern mechanism can be used in the present instance.

I claim as my invention:

1. In a circular rib knitting machine with an even number of feeds and having two sets of needles, *i. e.*, cylinder and dial, one set of needles being divided into two groups, one group being long needles and the other short needles, an automatic striper at each feed for changing the color of yarn, two independent cam races one for the long needles and the other for the short needles, each cam race including a tucking cam at each feed in each cam race, operating means with connections therefrom to the tucking cams, the long needles tucking at one feed and knitting at the other, while the short needles knit at the first mentioned feed and tuck at the other for vertical striping or reversing the order of tucking and knitting for making checks, or both groups of needles knitting, substantially as described.

2. In a circular rib knitting machine with an even number of feeds and with two sets of needles, *i. e.*, cylinder and dial, one set of needles being divided into two groups, one group having long needles and the other short needles, two independent cam races, one for the long needles and the other for the short needles, each cam race including a tucking cam at each feed in each cam race, a ring movable circumferentially of the machine with connections therefrom to the tucking cams to make each group of needles knit and tuck alternately at alternate feeds, and in opposition to the other group of needles, or to make both groups of needles knit, substantially as described.

3. In combination in a rib knitting machine, the long and short needles in one set, a plurality of feeds, upper and lower sets of cams at each feed for the short and long needles, adjusting cams for the needle cams, a pair of vertically movable rods at each feed operated by the cam means, the first rod at one feed being connected with the upper needle cam while the first rod at the other feed is connected with the lower needle cam, while the second rods at the two feeds are connected respectively to the lower and upper needle cams, substantially as described.

4. In combination in a circular knitting machine, long and short needles in one circle, a set of upper and a set of lower needle cams, each set including needle advancing cams, one arranged over the other, adjustable for knitting or tucking, a cam ring carrying the said cams, rods movable vertically of the cam ring, one being connected to the advancing cam of the upper set and the other being connected to the advancing cam of the lower set, and cam means operating circumferentially of the cam ring for operating the said rods and operating connections for the said cam means, substantially as described.

5. In a circular knitting machine, a circle of needles divided into two groups long and short, two yarn feeds each consisting of two yarn fingers with means for operating said yarn fingers automatically to change the yarn, two independent cam races one for the long needles and one for the short needles, two tucking cams at each feed, one in one race and the other in the other race, and means for operating said tucking cams automatically into tucking or knitting position in predetermined order and relation in respect to each other, substantially as described.

6. In combination in a circular knitting machine having a circle of needles composed of two sets, one long needles and the other short needles, two yarn feeds, each being a yarn changer, a tucking cam for each set of needles at each feed, a cam ring carrying said cams, and cam means adjustable circumferentially of the machine and having three positions one for simultaneously setting the tucking cams to knit on one set of needles and tuck on the other at one feed, and to tuck on the said one set and knit on said other set at the other feed, said cam means when in another position, reversing the relative knitting and tucking action just mentioned, and when in another position making both sets of needles knit at both feeds, substantially as described.

In testimony whereof, I affix my signature in presence of two witnesses.

FRANK B. WILDMAN.

Witnesses:
  E. R. ROBERTS,
  OWEN BALLARD.